United States Patent

Satzler

[11] Patent Number: 5,975,224
[45] Date of Patent: Nov. 2, 1999

[54] METHOD FOR CONTROLLING STEERING IN A HYDROSTATIC DRIVE SYSTEM HAVING DIFFERENTIAL STEER

[75] Inventor: Ronnie L. Satzler, Princeville, Ill.

[73] Assignee: Caterpillar Inc., Peoria, Ill.

[21] Appl. No.: 08/988,622

[22] Filed: Dec. 10, 1997

[51] Int. Cl.[6] .................................................. B62D 6/00
[52] U.S. Cl. .......................................... 180/6.44; 180/6.3
[58] Field of Search ........................... 180/6.2, 6.3, 6.44, 180/6.7, 6.24, 6.28; 701/41, 42; 303/146, 147, 189

[56] References Cited

U.S. PATENT DOCUMENTS

| | | | |
|---|---|---|---|
| 4,174,762 | 11/1979 | Hopkins et al. | 180/6.44 |
| 4,471,669 | 9/1984 | Seaberg | 74/687 |
| 4,519,275 | 5/1985 | Maruyama et al. | 74/866 |
| 4,700,794 | 10/1987 | Bernhagen et al. | 180/6.44 |
| 4,949,823 | 8/1990 | Coutant et al. | 192/4 C |
| 5,473,541 | 12/1995 | Ishino et al. | 364/424.07 |
| 5,477,455 | 12/1995 | Ishino et al. | 364/424.07 |
| 5,535,840 | 7/1996 | Ishino et al. | 180/6.44 |
| 5,569,109 | 10/1996 | Okada | 475/28 |
| 5,611,405 | 3/1997 | Ishino et al. | 180/6.44 |
| 5,857,532 | 1/1999 | Satzler | 180/6.2 |

FOREIGN PATENT DOCUMENTS 2135256A 8/1984 United Kingdom.

Primary Examiner—Kevin Hurley
Attorney, Agent, or Firm—J. W. Burrows

[57] ABSTRACT

A method is provided for controlling steering in a hydrostatic drive system having a differential steer mechanism that uses flow from the hydrostatic drive system to drive the differential steer motor. The method utilizes independently controlled brakes on the respective right and left drive units to assist the differential steer mechanism in the event the pressurized fluid from the hydrostatic drive system is reduced during the operation of the machine.

4 Claims, 1 Drawing Sheet

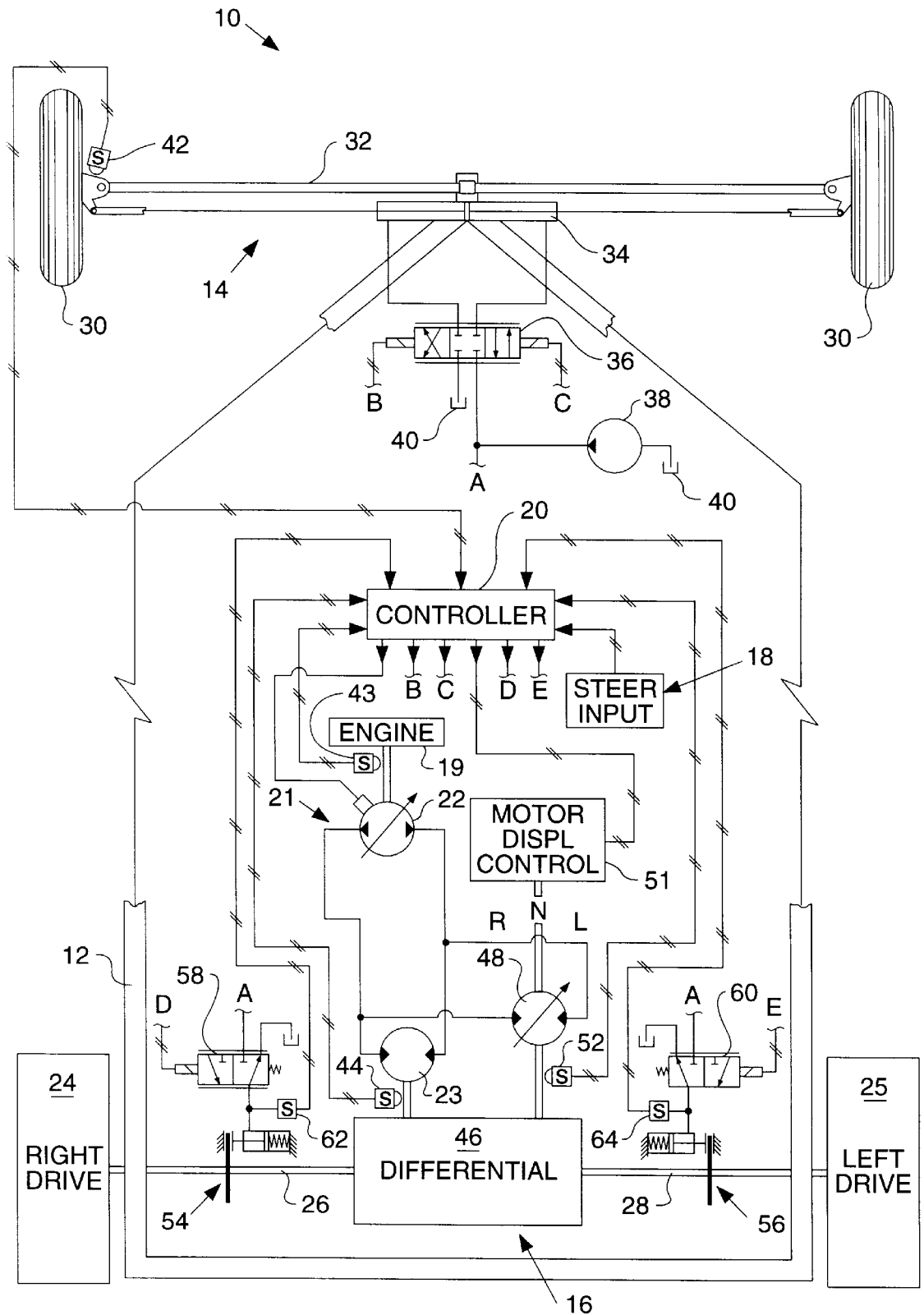

METHOD FOR CONTROLLING STEERING IN A HYDROSTATIC DRIVE SYSTEM HAVING DIFFERENTIAL STEER

TECHNICAL FIELD

This invention relates generally to controlling the steering of a machine and more particularly to a method for controlling the steering in a machine having a hydrostatic drive system with a differential steer mechanism.

BACKGROUND ART

Hydrostatically driven machines are well known in the art. In some of these machines, a pair of hydrostatic units are used to individually provide power to the associated right or left drive units. Each of the hydrostatic units include an engine driven pump fluidity connected in a closed loop to a hydraulic motor which transmits torque therefrom. In order to steer the machine, the speed of one of the hydrostatic units is either increased or decreased with respect to the other hydrostatic unit. In other machines, a single hydrostatic unit is used to transmit power from the engine to the respective drive units through a differential. It has been known to use clutch/brake type steering but this does not provide constant power to both drive units during steering. It has also been known to provide a differential steer mechanism having a hydraulic steer motor operative to input a torque to the differential steer mechanism to change the relative speed outputs to each of the drive units to provide steering. In these known differential steer mechanisms, the hydraulic steer motor is connected to a dedicated pump or it receives fluid from an implement pump. These known arrangements either require an extra pump or an oversized implement pump.

The present invention is directed to overcoming one or more of the problems as set forth above.

DISCLOSURE OF THE INVENTION

In one aspect of the subject invention, a method is provided for controlling the steering of a machine having a hydrostatic drive system with a differential steer mechanism. The differential steer mechanism includes a variable displacement steer motor connected thereto and operative to receive and transmit a desired steer input to the differential steer mechanism. The machine includes respective drive units connected to the differential steer mechanism and also includes an electronic controller that controls the hydrostatic drive system and other system parameters. The method includes the steps of connecting the variable displacement fluid motor to the hydrostatic drive system to obtain a source of pressurized fluid, sensing the speed of the variable displacement fluid motor and delivering a signal representative of the speed thereof to the electronic controller, providing an independently controlled brake for each of the respective drive units, controlling the steering of the machine by changing the displacement of the variable displacement motor to control the speed thereof in response to receipt of a signal from the electronic controller that is representative of the desired steer input, and providing steering assist by controllably applying the appropriate one of the independently controlled brakes in the event the speed of the variable displacement motor falls below the required speed needed to satisfy the desired steer input.

BRIEF DESCRIPTION OF THE DRAWINGS

The sole drawing is a diagrammatic illustration of a machine incorporating an embodiment of the subject invention.

BEST MODE FOR CARRYING OUT THE INVENTION

Referring to the sole drawing, a machine 10 is illustrated and includes a frame 12, first and second steering arrangement 14,16, a steer input arrangement 18, an engine 19, an electronic controller 20, and a power transmission 21. The power transmission 21 includes a variable displacement pump 22 fluidity connected to a fixed displacement fluid motor 23. The output from the fluid motor 23 is connected to right and left drive units 24,25 through respective output shafts 26,28.

The first steering arrangement 14 includes steerable wheels 30 spaced from one another by an axle 32. The axle 32 is connected to the frame 12 and a steering cylinder 34 is disposed between the steerable wheels 30 and operative to cause the respective steerable wheels 30 to angle with respect to the frame 12. This type of steering is normally referred to as ackerman steering. Even though two wheels 30 are illustrated, it is recognized that a single steerable wheel could be connected to the frame 12.

A steering control valve 36 is operatively disposed between the steering cylinder 34 and a source of pressurized fluid 38, such as a hydraulic pump, that receives fluid from a reservoir 40. The steering control valve 36 is a three position proportional control valve that is movable between a centered, flow blocking position and first and second operative positions. The steering control valve 36 is movable from its centered position in response to receipt of an electrical signal from the electronic controller 20. When the steering control valve 36 is moved towards its first operative position, the steerable wheels 30 are angled in one direction and when the steering control valve 36 is moved towards its second operative position, the steerable wheels 30 are angled in the opposite direction.

A sensor 42 is disposed relative to the axle 32 and one of the steerable wheels 30 and operative to direct an electrical signal representative of the angle of steer to the electronic controller 20.

The steer input arrangement 18 directs an input signal to the controller 20 that is representative of the desired angle of steer required by the operator. The controller 20 directs respective command signals to the steering control valve 36.

A speed sensor 44 is located generally at the output of the power transmission 21 and is operative to direct a signal to the controller 20 that is representative of the speed from the power transmission 21. More specifically, the sensor 44 is located at the output of the fixed displacement motor 23. The controller uses the speed output from the fluid motor 23 to calculate the ground speed of the machine 10.

A differential steer mechanism 46 is disposed between the output of the fluid motor 23 and the respective output shafts 26,28 and is operative to vary the relative speeds of the respective output shafts 26,28. The differential steer mechanism 46 has a variable displacement fluid steer motor 48 connected thereto. The variable displacement steer motor 48 is fluidity connected to the variable displacement pump 22 of the power transmission 21 in parallel with the fixed displacement motor 23 of the power transmission 21. The output speed of the steer motor 48 determines the magnitude of the relative difference in speed between the respective output shafts 26,28 and therefore the difference in speed of the right and left drive units 24,25. The direction of rotation and displacement of the steer motor 48 is controlled by a displacement controller 51 in response to receipt of a signal to the displacement controller 51 from the electronic controller 20.

A sensor 52 is associated with the output of the fluid steer motor 48 and operative to deliver a signal to the controller 20 that is representative of the speed of the steer motor 48. The controller 20 uses the speed signal from the steer motor 48 to calculate the difference in speed between the output shafts 26,28 and thus determine the angle of steer of the machine 10 as established by the differential steer mechanism 46.

A first brake 54 is disposed on the first output shaft 26 and a second brake 56 is disposed on the second output shaft 28. Each of the first and second brakes 54,56 is spring applied and pressure released in response to receipt of pressurized fluid from the source of pressurized fluid 38. Respective brake control valves 58,60 are disposed between the pump 38 and the respective independently controlled brakes 54,56. Each of the brake control valves 58,60 is spring biased to a position at which the pressurized fluid from the pump 38 is blocked and the actuating chamber of the brake is open to the reservoir 40. Each is movable towards a position at which the pump 38 is in fluid communication with the associated one of the brakes 54,56 upon receipt of a signal from the electronic controller 20.

It is recognized that the displacement of the variable displacement steer motor 48 could be controlled in various ways without departing from the essence of the subject invention. It is also recognized that the right and left drive units could be either wheels, tracks or continuous belts. It is further recognized that the subject machine could have only the tracks or continuous belts for the right and left drive units and not have the steerable wheels and the first steering arrangement. In such a machine with a hydrostatic drive system, the steering of the machine would be controlled through the right and left drive units by the differential steering mechanism 46 in cooperation with the electronic controller 20 and the independently controlled brakes 54,56.

Industrial Applicability

In the operation of the machine 10, as long as the machine 10 is not being subjected to a steer input, the machine travels in a straight line. If a steer input is made through the steer input arrangement 18, a steer input signal is directed to the controller 20. The controller 20 directs a command signal to the steering control valve 36 moving it towards the appropriate operative position to steer or angle the steerable wheels 30. As the steerable wheels 30 are being steered, the sensor 42 monitors the angle of steer and directs the information to the controller 20.

Simultaneously, the controller 20 directs a command signal to the motor displacement controller 51 to change the displacement of the variable displacement motor 48. The signal from the controller 20 determines the direction that the steer motor 48 turns and the magnitude of the change in displacement. Based on the established displacement of the steer motor 48, it turns at a speed in proportion to the quantity of fluid being received from the hydrostatic drive system. The speed of the steer motor 48 determines the relative difference between the speeds of the output shafts 26,28. The controller 20 calculates and synchronizes the angle of steer of each of the first and second steering arrangements 14,16 to control the turning of the machine 10.

By continuously sensing the steer angle of the first steering arrangement 14 and the relative difference between the speeds of the output shafts 26,26, the controller 20 maintains a match between the angle of steer of the first and second steering arrangements 14,16. If one or the other of the first and second steering arrangements 14,16 is to great, the controller 20 directs the appropriate command signal thereto to change its angle of steer to match the other.

If the steer angle required by the steer input arrangement 18 is greater than can be maintained by the second steering arrangement 16, the controller 20 directs at command signal to the appropriate brake 54,56 to proportionally apply the brake to assist the second steering arrangement 16. This permits the machine 10 to negotiate tighter turns under various operating conditions.

In the event the machine 10 is traveling down an incline or decelerating, the volume and pressure of the fluid from the variable displacement pump 22 to the fixed displacement motor 23 may decrease. In this situation, there may not be sufficient fluid and/or pressure to drive the variable displacement motor 48 at the speed required to provide the requested steering of the machine 10 through the second steering arrangement 16. In order to maintain the desired steering of the machine 10 through the second steering arrangement 16, the controller 20 directs a command signal to the appropriate one of the independently controlled brakes 26/28 to proportionally apply the appropriate brake to assist the differential steer unit 46. The appropriate brake is applied to the extent needed to maintain the angle of steer required by the steer input controller 18. By applying the appropriate brake 54/56, the flow needed to turn the steer motor 48 at the desired speed to provide the steering is likewise reduced. Therefore, the flow needed to maintain the vehicle speed is still available to the fixed displacement motor 23 and the steer motor 48 is still receiving a volume of pressurized fluid to provide a portion of the needed steering of the machine 10.

In view of the foregoing, it is readily apparent that the subject arrangement provides a method to control the steering in a hydrostatic drive system having a differential steer mechanism 46 that uses pressurized fluid from the hydrostatic drive system to provide steering of the machine 10. The method utilizes independently controlled brakes 54,56 to assist the differential steer mechanism 46 in the event the pressurized flow from the hydrostatic drive system is decreased.

Other aspects, objects and advantages of this invention can be obtained from a study of the drawings, the disclosure and the appended claims.

I claim:

1. A method for controlling steering in a machine having a hydrostatic drive system with a differential steer mechanism, the differential steer mechanism includes a variable displacement fluid motor connected thereto that is operative to receive and transmit a desired steer input thereto, the machine includes respective drive units connected to the differential steer mechanism and an electronic controller operative to control the hydrostatic drive system and other system parameters, the method comprising the steps of:

connecting the variable displacement fluid motor to the hydrostatic drive system to obtain a source of pressurized fluid;

sensing the speed of the variable displacement fluid motor and delivering a signal representative of the speed thereof to the electronic controller;

providing an independently controlled brake for each of the respective drive units;

controlling the steering of the machine by changing the displacement of the variable displacement motor to control the speed thereof in response to receipt of a signal from the electronic controller that is representative of the desired steer input; and providing steering assist by controllably applying the appropriate one of the independently controlled brakes in the event the speed of the variable displacement motor falls below the required speed needed to satisfy the desired steer input.

2. The method of claim 1 including the steps of sensing the speed of machine and directing a signal to the electronic controller representative of the speed thereof.

3. The method of claim 2 wherein the hydrostatic drive system includes a variable displacement pump and the method includes the step of controlling the displacement of the variable displacement pump in response to the desired speed of the machine and the desired steer input.

4. The method of claim 3 wherein the machine includes steerable wheels and a separate steering arrangement and the method includes the step of controlling the separate steering arrangement so that it is synchronized with the differential steering arrangement.

\* \* \* \* \*